(12) United States Patent
Sinn et al.

(10) Patent No.: US 6,454,510 B1
(45) Date of Patent: Sep. 24, 2002

(54) LIVESTOCK UNLOADING SYSTEM

(75) Inventors: Steven C. Sinn, Tremont, IL (US); Voris G. Feather, Tremont, IL (US); James Pyle, Harrodsburg, KY (US)

(73) Assignee: Turkey Scope, LLC, Tremont, IL (US)

( * ) Notice: Subject to any disclaimer, the term of this patent is extended or adjusted under 35 U.S.C. 154(b) by 25 days.

(21) Appl. No.: 09/596,350

(22) Filed: Jun. 17, 2000

(51) Int. Cl.$^7$ ............................................... B65G 67/24
(52) U.S. Cl. ...................... 414/393; 414/340; 119/846
(58) Field of Search ................................ 414/340, 346, 414/350, 351, 353, 393, 398, 503, 504, 505, 523, 528; 198/313, 314, 315, 316.1, 594, 632, 812; 119/845, 846

(56) References Cited

U.S. PATENT DOCUMENTS

| | | |
|---|---|---|
| 2,834,487 A | 5/1958 | Gaddis et al. |
| 3,066,817 A | 12/1962 | Bradshaw et al. |
| 3,253,577 A | 5/1966 | Lund |
| 3,272,182 A | 9/1966 | Lund |
| 3,292,965 A | 12/1966 | Powers |
| 3,420,211 A | 1/1969 | Hartvickson |
| 3,452,718 A | 7/1969 | Wright |
| 3,476,089 A | 11/1969 | Jerome |
| 3,524,558 A | 8/1970 | Mastracci et al. |
| 3,548,895 A | 12/1970 | Gentry, Jr. |
| 3,702,600 A * | 11/1972 | Bright et al. ............... 119/846 |
| 3,706,300 A | 12/1972 | Wessinger |
| 3,722,477 A | 3/1973 | Weldy et al. |
| 3,825,107 A | 7/1974 | Carey et al. |
| 3,826,353 A | 7/1974 | Greasley et al. |
| 3,916,835 A | 11/1975 | Reynolds |
| 3,942,476 A | 3/1976 | Napier |
| 3,945,484 A | 3/1976 | Oury |
| 4,037,565 A * | 7/1977 | Ledwell, Jr. ............... 119/846 |
| 4,151,906 A | 5/1979 | Pfeiffer |
| 4,210,237 A | 7/1980 | Gram |
| 4,279,555 A * | 7/1981 | Rydell ........................ 198/594 |
| 4,303,258 A | 12/1981 | Davis |
| 4,307,683 A * | 12/1981 | Parker, Jr. ................... 119/843 |
| 4,321,889 A * | 3/1982 | Michaelson et al. ..... 198/316.1 |
| 4,365,591 A | 12/1982 | Wills et al. |
| 4,380,969 A | 4/1983 | Thomas |
| 4,499,856 A | 2/1985 | Hecht et al. |
| 4,600,351 A | 7/1986 | Nelson |
| 4,780,041 A | 10/1988 | Ashby |
| 4,813,526 A * | 3/1989 | Belanger .................... 198/314 |
| 4,878,799 A | 11/1989 | Seto et al. |
| 4,923,359 A | 5/1990 | Petri et al. |
| 5,060,596 A | 10/1991 | Esbroeck |
| 5,067,867 A | 11/1991 | Ruder et al. |
| 5,078,259 A | 1/1992 | Honsberg |
| 5,195,687 A | 3/1993 | Derichs |
| 5,256,021 A | 10/1993 | Wolf et al. |
| 5,288,201 A | 2/1994 | Pippin |
| 5,307,917 A | 5/1994 | Hall |
| 5,322,154 A | 6/1994 | Lenherr |
| 5,351,809 A | 10/1994 | Gilmore et al. |

(List continued on next page.)

FOREIGN PATENT DOCUMENTS

SU    1020280    9/1981

*Primary Examiner*—James W. Keenan
(74) *Attorney, Agent, or Firm*—Cook, Alex, McFarron, Manzo, Cummings & Mehler

(57) ABSTRACT

A livestock unloading system for unloading livestock from a storage unit of a transport vehicle to a processing plant or storage facility. The unloading system includes a conveyor system whereby livestock ride from the storage unit to their destination. The conveying system includes a telescoping end that extends into and retracts from a coop during the unloading process. A system of hydraulics controls the speed of the conveyor, aids in the leveling of the machine, adjusts both the angle and tier of unloading, and levels and controls the telescoping end of the apparatus.

23 Claims, 7 Drawing Sheets

U.S. PATENT DOCUMENTS

| | | |
|---|---|---|
| 5,360,097 A | 11/1994 | Hibbs |
| 5,470,194 A | 11/1995 | Zegers |
| 5,637,183 A | 6/1997 | Borner |
| 5,642,803 A | 7/1997 | Tanaka |
| 5,660,147 A | 8/1997 | Wills et al. |
| 5,685,416 A | 11/1997 | Bonnet |
| 5,743,217 A * | 4/1998 | Jerome ........................ 119/846 |
| 5,902,089 A * | 5/1999 | Sinn et al. ................... 414/398 |
| 5,915,338 A * | 6/1999 | Fitzsimmons et al. ...... 414/398 |
| 6,048,157 A * | 4/2000 | Jerome ........................ 414/393 |

* cited by examiner

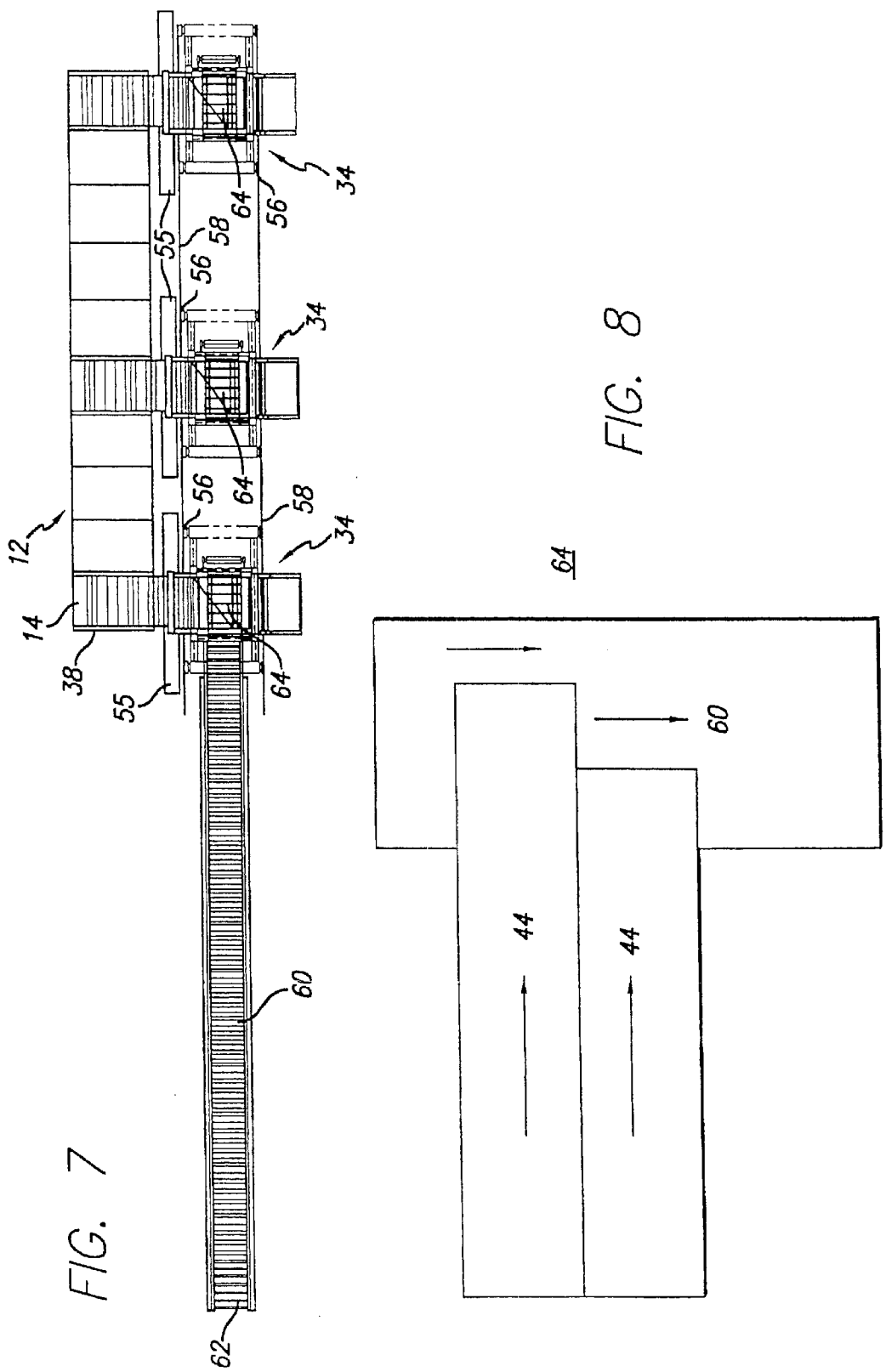

LIVESTOCK UNLOADING SYSTEM

BACKGROUND OF THE INVENTION

The present invention relates generally to a system for handling livestock and more particularly to a system, means, device or apparatus to effect the efficient handling of livestock in the unloading of same from a transport vehicle to a farm site or processing plant.

It will be understood and appreciated that as the foregoing description of the present invention may be explained as it pertains to the handling of poultry, this description in no way shall be indicative of the limiting of "livestock" thereto.

Commercial poultry, such as turkeys, chickens, guineas, peafowl, ostriches, ducks, geese, swans and pigeons, have been one of man's main staples of protein throughout history. For centuries poultry was raised and processed on the farm and locally delivered to those who desired such fresh poultry. But as the population migrated to towns and cities, delivery of fresh poultry became increasingly difficult while the demand for processed poultry increased dramatically. In response to this need, fresh processed poultry now had to be transported to the markets located in these cities.

The poultry was customarily gathered manually at poultry houses, boxed or crated with numerous birds per crate, manually loaded aboard an open truck or van, and transported. The problems created by such a procedure were both numerous and significant. The manual handling of the poultry not only created a materially high cost involved in raising the poultry and preparing them for market, but it also created certain physical dangers to both the poultry as well as the workmen.

For example, during hand catching and subsequent handling of poultry, some birds are bruised, injured, or even killed due to a violent reaction of the birds or the unintentional rough handling by the workmen. Additionally, fowl inevitably beat their wings in an effort to escape upon capture, this would frequently result in a bird striking the handler with sufficient force to cause physical injury.

As technology was developed for the processing and safe storage of poultry, small processing plants developed and the manual loading of crates or coops began to improve. One of the first significant improvements, particularly in the turkey industry, was to create coops or crates which were permanently attached to a trailer or truck bed. These trucks contain large numbers of individual coops attached on the truck body. The coops having doors opening outward and being arranged in horizontal rows and vertical tiers. These coops or compartments typically having a permanent middle portion partition, and as such require loading from both sides of the truck. Not only is this time consuming, but loading from both sides also requires the trailer to turn around with all of its weight on one side thus causing an unsafe situation to driver, livestock, machinery and trailer.

The usual method of loading the poultry was to catch the animals individually and then lift and carry them to the coops while using makeshift platforms to reach the higher coops or to hand the birds to other workmen who are clinging to or standing on supports attached to the sides of the truck. The adult male turkey may weigh in excess of forty pounds, thus, any mishandling thereof causes a high incident of injuries to workers and animals alike, not to mention the considerable time requirements needed to accomplish the loading/unloading of a complete truck. The past thirty years has seen various conveyor belt apparatus designs to convey the poultry to the different heights of the vertical tier of coops. However, at the exit end of the conveyor belt, personnel still manually stuffed turkeys into the compartments or coops. Thus, while such apparatus eliminated the laborious task of lifting animals to the different heights of coops in the vertical tier, the arduous task of stuffing the live poultry continued.

In light of the preceding problems, there has been an effort in the art to develop a method of loading poultry for transport with a minimal amount of manual labor. For example, U.S. Pat. No. 5,902,089, issued May 11, 1999 describes a poultry loading apparatus for transporting poultry from a confinement area such as a poultry house to a transport vehicle to allow transport of poultry from farm-to-farm or from farm-to-processing plant. This is accomplished through the use of a base and a sectional mainframe defining a transport conveyance system. A section of the mainframe is pivotably attached to another section which is pivotably attached to the base. The apparatus further utilizes a control system for its overall leveling and pivotal height adjustments, as well as the extending/retracting capabilities of its conveyance.

Such a conveyance system certainly provides for an apparatus and system for loading poultry for transport that minimizes labor and costs while maximizing efficiency. However, once the fully loaded vehicle stops at its desired location, it must be unloaded. Although this conveyance apparatus is certainly capable of such unloading, it may be difficult to maneuver this apparatus within the typically less spacious area of a processing plant. Thus, there exists a need for a poultry unloading apparatus and system that reduces labor costs and damaged product while increasing safety and efficiency.

Today, the poultry business is a multi-billion dollar industry. Large companies dominate the production, slaughter and marketing of products. Since poultry companies are now fewer in number, they therefore demand large quantities of animals daily for processing. In fact, enormous numbers of poultry are transferred daily from production facilities to the slaughter plant or to different production facilities en route to the slaughter plant.

In view of the aforementioned needs and the shortcomings of the prior art, it is therefore an object of the present invention to provide a system that overcomes the deficiencies of the current practices whereby an apparatus and system is provided for unloading livestock for transport with a minimum amount of labor and with maximum efficiency at a minimum cost.

It is another object of the present invention to provide a livestock unloading system which maximizes efficiency, decreasing damage to the animals and decreasing contamination during the processing of the animals.

It is another object of the present invention to provide a livestock unloading system which minimizes labor costs by reducing the number of employees as well as the turnover rate of employees.

It is yet another object of the present invention to provide a livestock unloading system whereby the manual and perhaps rough handling of the livestock is eliminated thereby improving overall animal quality by reducing animal stress and minimizing any damages sustained to the livestock.

Still another object of the present invention to provide a user friendly livestock unloading apparatus that may be operated effectively by a single person.

These and other objects, features and advantages of the present invention will be clearly understood through a consideration of the following detailed description.

SUMMARY OF THE INVENTION

According to the present invention, there is provided a livestock unloading system having a storage unit which includes two sides and a width upon a transport vehicle such that the ends are readily accessible from either side. A base member adapted to be supported on the ground includes a telescopic conveyor section with a livestock receiving end and a discharge end, the receiving end being extendable and retractable within the storage unit. An elevating support member adjusts the height of the telescopic conveyor section relative to the ground. A mobile discharge belt section is pivotably attached to the elevating support member at one end and is capable of surface traversing at its other end. The mobile discharge belt section is movably mounted to a stationary conveying section.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 7 is a top view of the livestock unloading system constructed in accordance with the principles of the present invention illustrating three system unloading positions.

FIG. 8 is a top view of a conveyor transfer point of the preferred embodiment of the present invention.

DESCRIPTION OF THE PREFERRED EMBODIMENT

Figure 1:
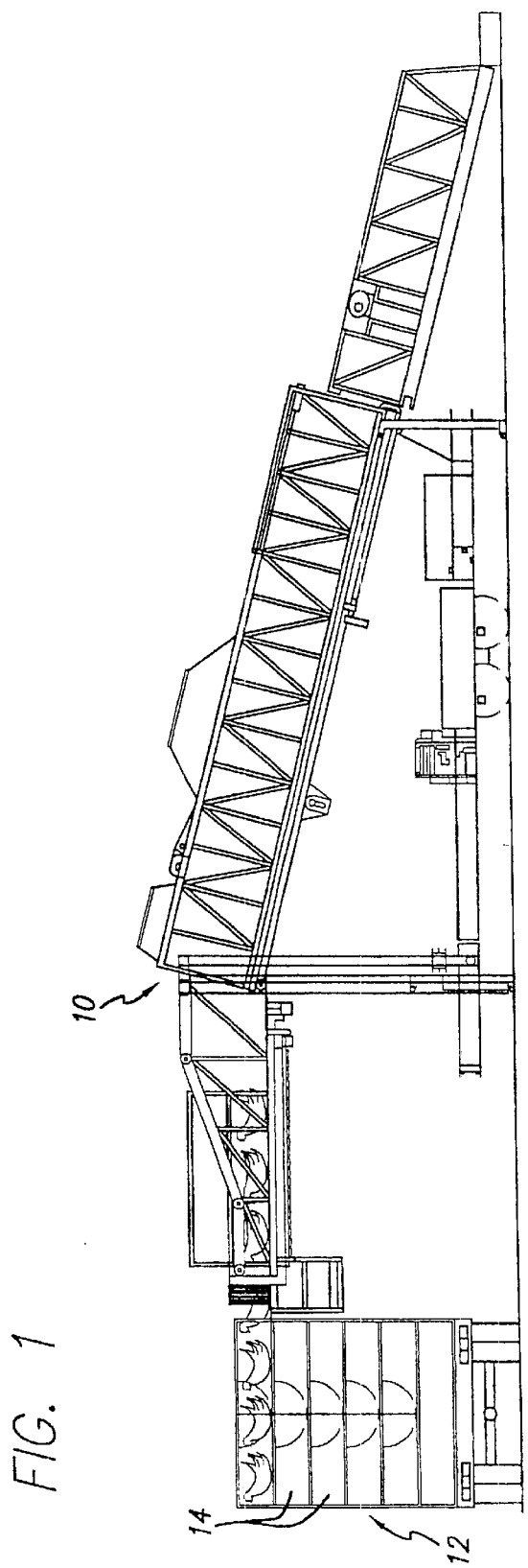
FIG. 1 is a field loading plan view of a livestock loading system including the loading apparatus and transport vehicle.

The present invention provides for a system of unloading livestock from a transport vehicle to a farm site or processing plant. As the livestock first require to be loaded upon the vehicle, FIG. 1 illustrates a livestock loading system much like the one disclosed in applicant's co-pending application Ser. No. 09/277,427, incorporated herein by reference. The system is shown in its operable state and includes a loading apparatus 10 perpendicular to a transport vehicle 12 having numerous rows of poultry (for example) coops 14. During loading, turkeys (for example) are telescoped by a plastic, steel or rubber conveyor belt into enlarged coops and comfortably placed on the coop floor. Once the loading process is complete, the transport vehicle 12 departs to eventually arrive at an unloading destination such as another farm or a processing plant.

Figure 2:
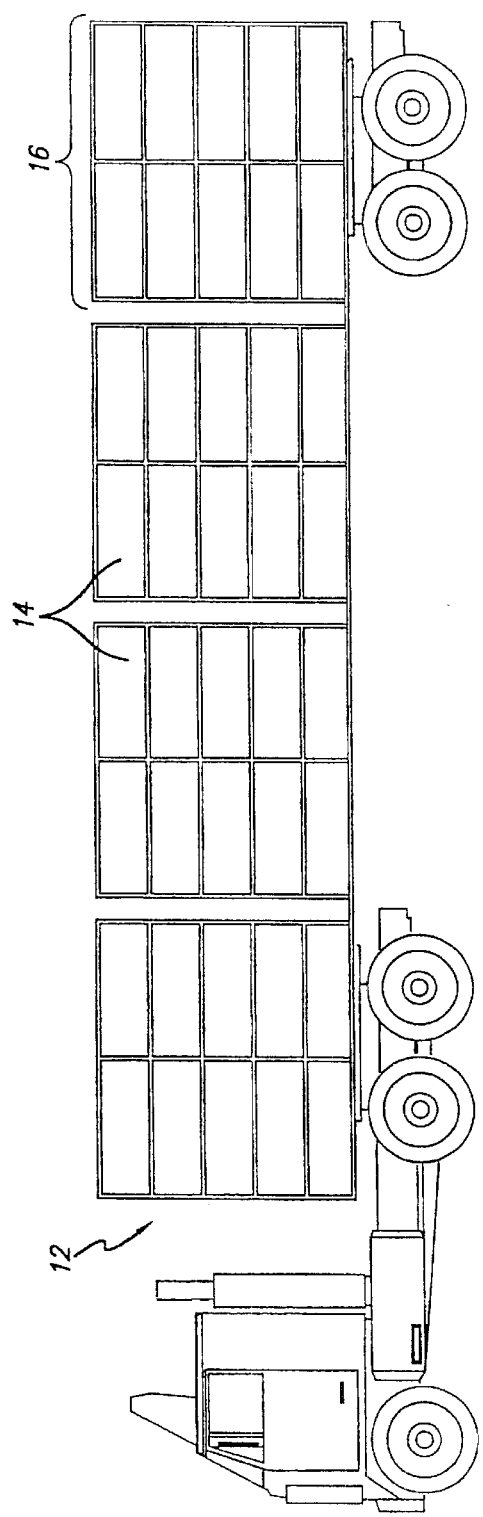
FIG. 2 is a side view of a transport vehicle constructed in accordance with the principles of the present invention.
Figure 3:
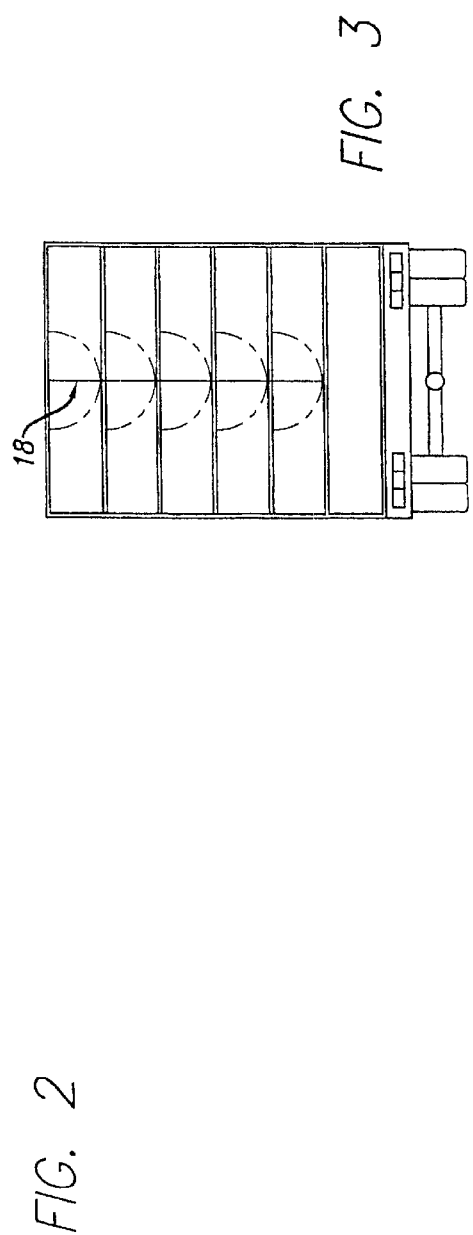
FIG. 3 is a rear view of the transport vehicle of FIG. 2.

The present invention includes, among other things, a uniquely designed transport vehicle. FIGS. 2 and 3 generally illustrate the advantages of this transport vehicle design. In particular, FIG. 2 depicts a side view of the transport vehicle or trailer 12 showing how the transport units or coops 14, sometimes referred to as "racks" in the art, are arranged on the bed of the truck. The truck or trailer may be of conventional design or of a customized design. In this particular embodiment, there are 10 coops 14 per coop module 16. FIG. 3 shows an optional swinging partition 18 of the coops which may swing in either direction or perhaps locked in a perpendicular position, depending upon the set-up of the loading/unloading procedure.

A standard coop trailer typically includes one hundred forty four coops per trailer, with each coop having a volume of about 16 cubit feet. This standard trailer requires the loading of one side of the trailer and turning the trailer around to load the opposite side. By contrast, the present system includes a coop trailer 12 with coops 14 having a volume of about 64 cubit feet. The swinging partition 18 of this trailer 12 allows the extension of the primary index of the unloading apparatus through the whole width of the coop, thus allowing the trailer to be completely unloaded from one side. With fewer and larger coops, loading/unloading speeds can match processing plants line speed; and biosecurity and cleaning of coop modules are easier and require less time.

Figure 4:
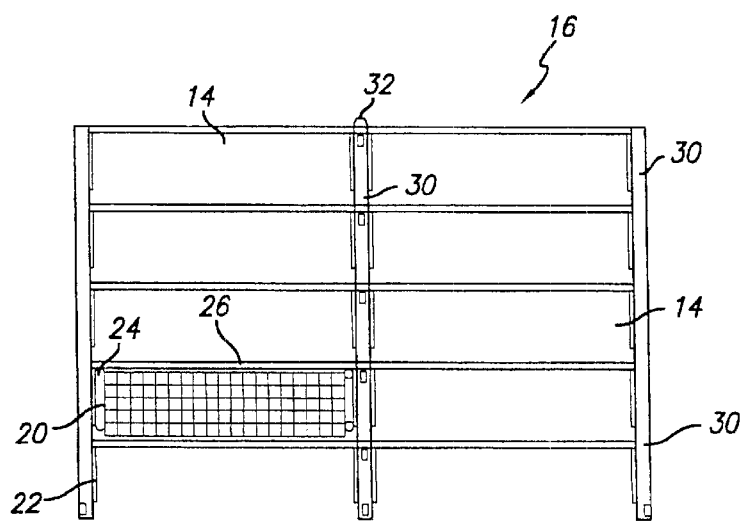
FIG. 4 is an enlarged side view of a module of the transport vehicle of FIG. 2.
Figure 5:
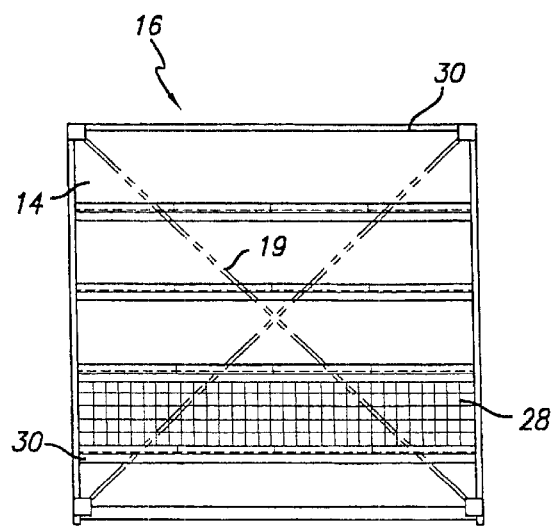
FIG. 5 is an enlarged rear view of the module of FIG. 4.

More particularly, the preferred embodiment of the coop module 16 design of the present invention is illustrated in FIGS. 4 and 5. FIG. 4 shows an enlarged side view of the coop module 16 of the coop trailer 12. This particular module 16 has ten (10) openings on each side, one for each of the ten coops 14. However, to reduce construction costs and to conform to different lengths and styles of trailers, modules may be built together or in single rows. Thus, modules could have 20 to 40 coops instead of 10, with the possibility of one module per trailer. The coops 14 have openings on either side to enable the telescoping section of the unloading apparatus to extend from either side of the trailer 12 depending upon field conditions and operator's preference. The configuration of the coop is adaptable to a multitude of trailer sizes. For example, a drop deck trailer can utilize 5 coops stacked on the top deck and 6 coops stacked on the drop deck. This will increase net hauling weight which depends on state laws. Additionally, different trailers attached to the coop modules may enhance other safety features such as reducing the center of gravity and increasing stability. The preferred embodiments module 16 is currently 11 feet 4.75 inches wide, but may obviously vary depending upon the length of the trailer 12. Each module 16 is preferably braced for stability with members in the form of an "X" 19 as shown in FIG. 5.

The coop floor support, not shown, is currently a checker pattern flat iron structure, while the coop floor is a thin durable and washable plastic compound. The floor is slid into place from the side and held in place by metal tabs or other means of securement. The floor may be more securely held atop the structure via screws in its middle, or rubber mounts attached above to allow the floor to flex to a minimal bend, particularly during the updraft wind pressure caused during transport without the livestock.

The coop door 20 is constructed of thin steel bars in a checker pattern to both give it strength and allow the flexibility to bend while maintaining shape. A runner guide 22 or the like is positioned on both sides of the door currently consisting of a thin rod to slide the door 20 opened and closed through the door's ringlets 24 or the like. To prevent any possible damage from the extension of the unloading apparatus, this guide is positioned roughly four inches off the floor. A hook 26 or the like locks the door 20 in the open position to prevent it from sliding down during loading/unloading and to prevent the animals from ensnaring themselves and/or dropping on personnel.

An additional mesh 28 is used for the sides of the coop. This mesh 28 is stationary and welded to the tubular steel frame 30 of the module. The size of the mesh is such that it allows for free air movement yet small enough where animal body parts cannot become entangled during transport and/or loading/unloading. This mesh may be enclosed by either wooden panels or a flexible curtain (not shown) during cold weather.

The coop module 16 of the present invention includes an attachment 32 in the middle support column. This attachment 32 enables the module to be lifted or placed on the flatbed trailer by a proper hoisting apparatus. The module is then attached to the trailer in a semi-secure manner to allow the module to move slightly during transport. This movement helps to deter stress cracks on the frame. The dimensions illustrated by FIGS. 4 and 5 are for the current coop module to be used with the unloading apparatus. Those dimensions are freely variable depending upon any particular condition.

Figure 6:
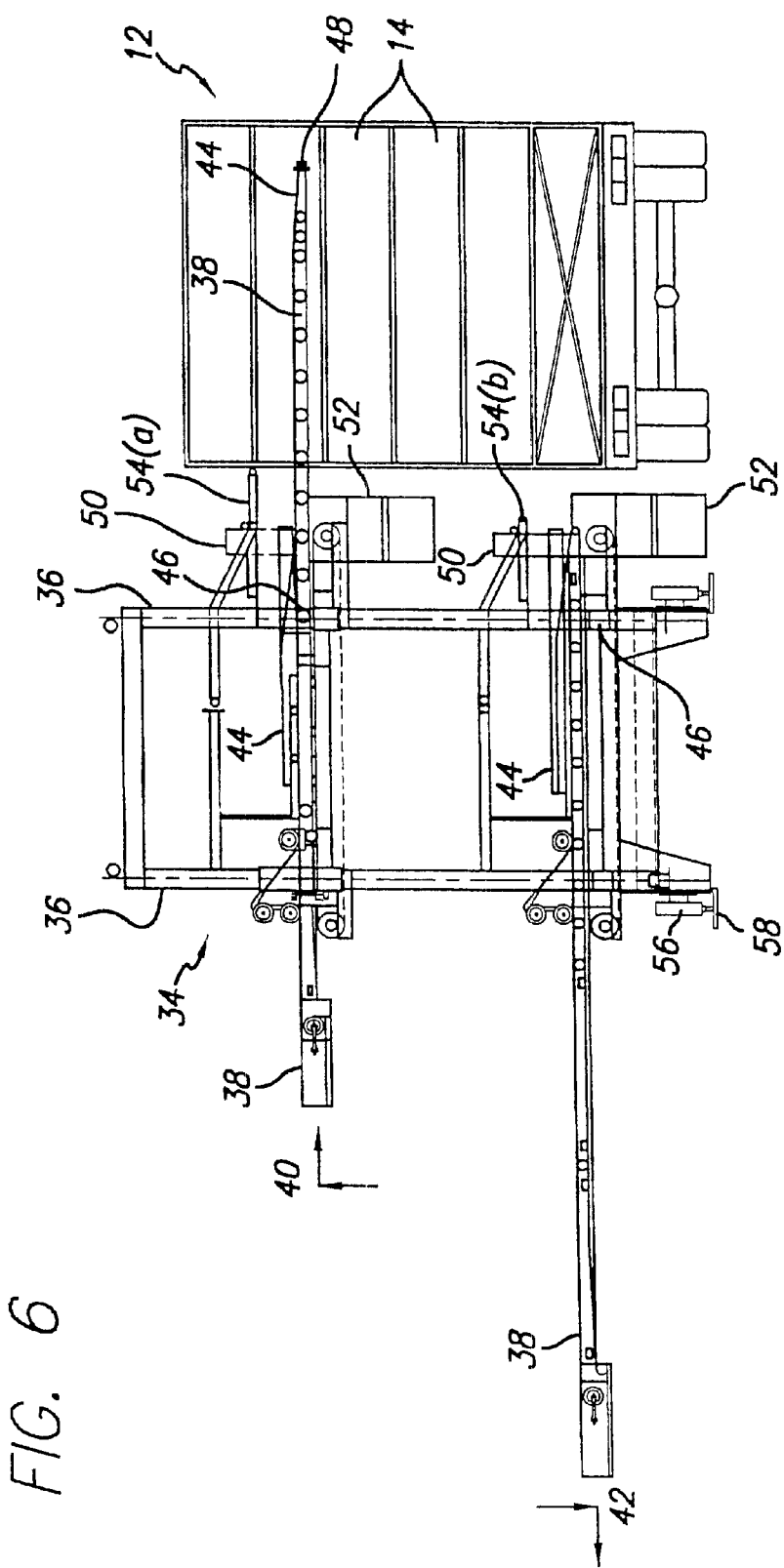
FIG. 6 is a back view of the livestock unloading system constructed in accordance with the principles of the present invention.

When such a transport vehicle 12 reaches a destination employing the present invention, it need only be positioned along side the base unloader unit 34 as shown in the rear view of FIG. 6. This may be accomplished through the use of guide bumpers and stop points (not shown). The mast mechanism 36 of base unloader unit 34 consists of, in the preferred embodiment, four ball screw mechanisms (although other lifting mechanisms may be employed) powered from one or more gearboxes. Not only do the ball screws lift the primary index 38 up and down (discussed more particularly below), but also are able to raise and lower the mobile discharge belt (see FIG. 9 60). As such, these ball screws are capable of lifting a large amount of weight in livestock and equipment. Because there are four ball screws, one in each corner of the mast, 36, they are required to be synchronized to raise and lower simultaneously, thus providing for a smooth height transition.

The primary index 38 extends from the base unloader unit 34 into the coop 14 of the trailer 12 in order to unload the livestock. FIG. 6 illustrates the primary index 38 in both the raised and extended position 40 as well as the retracted and lowered position 42. The primary index 38 is surrounded by a cleated plastic conveyor belt 44 which when inserted into the coop 14, will pick the poultry up from the coop floor and transport them towards the base unloader unit 34 where they will be transferred onto a generally perpendicularly positioned mobile discharge belt.

The primary index 38 includes a tilt mechanism 46 to aid in the leveling of the index as it is telescoped into the coop 14. Obviously, this type of movement requires precision coordinating. In other words, as the primary index is inserted on top of the coop floor, the tilt mechanism will maintain an equidistance from the bottom of the index to the coop floor via leveling switches which in turn activate the tilt cylinder. For example, the tilt mechanism will activate during the trailers naturally slight shift as weight is removed, or as the index, or possibly the entire base unloader unit, is re-positioned due to the excess cantilever weight as well as the weight of the livestock. In addition, trailer 12 springs may occasionally be defective causing the trailer floor and coop module floor to angle laterally in either direction. In such a case, the tilt mechanism 46 adequately compensates this occurrence by providing a leveling means. In addition to the tilt mechanism 46, the primary index 38 itself includes leveling switches on its nose 48 which allow the index to easily glide on the top of the coop floor. Furthermore, the base unloader unit 34 and/or primary index 38 may be required to twist in order to align parallel with the trailer, therefore, the tilt mechanism is also capable of a radial adjustment.

The controls for the base unloader unit 34 are found in the form of an operator control box 50 which provides protection from cleaning and safety from untrained personnel. Such controls include electric DC voltage joystick controls to activate electric solenoids shifting spool valves, as well as adjustments for maximum belt speeds, mast speed and parallel movement of base unloader unit/mobile discharge belt. The system is operable under the framework of an electric hydraulic system typical of nearly all hydraulic machinery. The hydraulic system will be powered by an electric motor attached to a hydraulic pump and located in a safe location away from the wash down process. These controls are operable from the operator platform 52 located on the base unloader unit. When the trailer 12 is in position, usually around 6-inches away from the platform 52, the operator takes his/her position on the platform 52 and begins the unloading process. Basically, the trailer 12 is lined up perpendicular to the base unloader unit 34 and the operator opens the coop door and begins unloading the bottom coop by inserting the primary index 38 into the coop. The primary index conveyor belt 44 of the preferred embodiment is in the form of a single endless conveyor which through the cooperation of communicating rollers and pulleys provides for a constant length and tension as the index is extended and retracted.

A second belt, the telescoping top belt 54, is also in communication with the primary index such that when the primary index 38 is extended into the coop 14 it also extends to the top of the coop door. Top belt 54 is shown both in its extended position 54a and its retracted position 54b. This top belt 54 prevents poultry from escaping and helps push the animals to the back of the primary index where they will be deposited on the mobile discharge belt (discussed more below).

Once a coop is emptied, the primary index is completely retracted, an optionally manned wash platform (FIG. 7 55) allows for the washing of the trailer, and the mast 36, index 38 and platform 52 are raised to the next coop. When a column of coops are unloaded, the base unloader unit 34 is moved laterally to the trailer to line up the next column of coops. This is accomplished via engaging the parallel movement mechanism of the base unloader unit 34. Since the base unloader unit 34 is supported by train car wheels 56, it is easily laterally transferred down the railroad track rails 58. This lateral movement may be automated by counters or electronic eyes or the like to enhance efficiency. FIG. 7 illustrates the parallel movement of the base unloader unit 34 as it moves from column to column down the trailer 12. In particular, the parallel movement mechanism of the base unloader unit 34 drives the wheels 56 on the track 58. Note that at each of these three illustrated positions, the primary index 38 is shown in an extended position within the top coop 14 of each column.

FIG. 7 also shows the mobile discharge belt 60 and the stationary discharge conveyor 62. Although the figures show that the base unloader unit is straddling the mobile discharge and stationary conveyor belt, it need not be. The mobile discharge belt 60 is designed to travel on top of the stationary discharge conveyor 62 so that the base unloading unit 34 can travel upon the tracks 58. The point of transfer 64 between the primary index belt 44 and the mobile discharge belt 60 is generally shown in the top view of FIG. 8. Basically, the primary index belt 44 conveys the poultry to the transfer point 64 upon the base unloader unit where they will leave the primary index belt 44 and begin their trek on the mobile discharge belt 60. This simplified schematic of FIG. 8 illustrates the poultry dropping on two points of the mobile discharge belt 60. This two-point drop of the preferred embodiment enables a smoother transition of the 90° turn than that of merely dropping the poultry on one location which would necessarily require the mobile discharge belt 60 to operate excessively fast. The number of dropping points may be increased or decreased depending on the modular plastic unit sizes and in-field requirements of conveying poultry to the stationary belts en route to further processing. Furthermore, in the case of processing plants that demand a large volume of poultry to maintain plant line speeds, the present invention is adaptable to adding a second primary index or perhaps employing two base unloader units.

Figure 9:
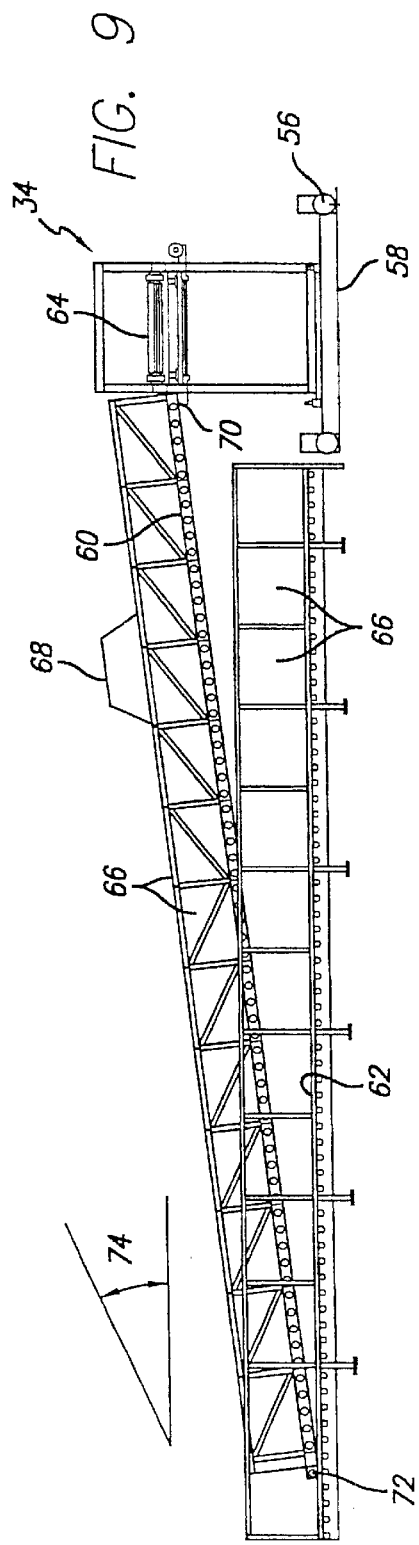
FIG. 9 is a side view of the livestock unloading system constructed in accordance with the principles of the present invention.

Once the poultry have crossed the point of transfer 64 on the base unloader unit 34, they are gently transported down via the mobile discharge belt 60. Referring now to FIG. 9, the base unloader unit 34, mobile discharge belt 60 and stationary discharge conveyor 62 are depicted in a side view to illustrate their interaction with one another. In particular, poultry are first unloaded from the coop via the primary index belt and transferred to the mobile discharge belt 60 through the point of transfer 64. When they reach the end of the mobile discharge belt 60, they are gently transferred onto the stationary discharge conveyor 62.

In the preferred embodiment, the mobile discharge belt 60 is enclosed on the sides and top with a high grade composite cover 66. Additionally, this conveyor is cooled by numerous fans 68 strategically positioned about its length to aid in the reduction of stress to the poultry and also to provide oxygen thereto. Furthermore, an automated wash system for biosecurity may be installed inside the tunnel. Thus, the poultry are kept calm and cool inside the darkened enclosed tunnel. The mobile discharge belt section is hinged 70 on one end to the base unloader unit 34 and includes rollers 72 at its other end. The rollers 72 allow the mobile discharge belt 60 to travel back and forth with the base unloader unit 34. The hinge enables the angle 74 of the discharge conveyor section to adjust as the mast raises and/or lowers in order to address the different levels of coops. As the hinged end of the discharge conveyor is raised or lowered, the opposite end either rolls towards the base unloader unit (if raised) or away from the base unloader unit (if lowered) upon the stationary discharge conveyor 62.

The function of the stationary discharge conveyor 62 is to act as the transfer from the mobile discharge belt as well as a delivery mechanism to down line processing such as a preshackled stunner followed by an automated shackler. This belt is also enclosed with a composite cover 66 to maintain a dark environment and cooled by fans 69 for the stress-free movement of poultry. An automated wash system may be installed for the biosecurity requirements of each plant inside this tunnel. This stationary belt may also be expanded to provide for extra storage space for poultry while empty trailers are switched for loaded trailers or provide a safety margin of livestock storage in case incoming trailers of livestock are delayed.

Figure 10:
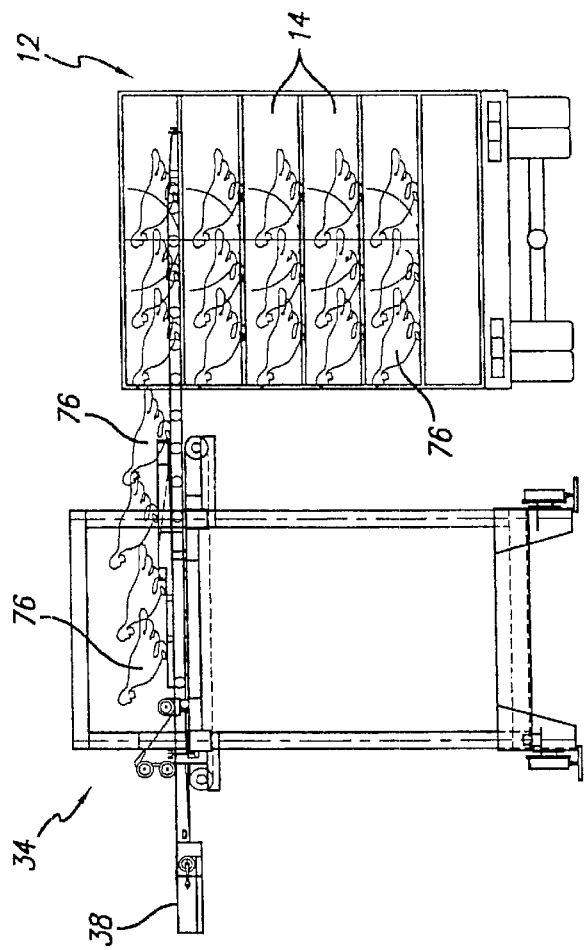
FIG. 10 is a back view unloading plant plan of the system of FIG. 9.

In order to more fully appreciate the advantages of the present invention, the remaining drawings (FIGS. 10–12) include illustrations of the poultry 76 during their different stages of the unloading process. Referring to FIG. 10, the poultry 76 are initially unloaded from the coop 14 of the trailer 12 by extending the primary index 38 of the base unloader unit 34 therein. The belt speed of the primary index is generally set at, for example, a predetermined speed of 25% greater than the speed of extension of the primary index. This along with a shovel roller (not shown) positioned at the end of the primary index, will ensure the safe pick up of the poultry from the coop floor. Note that the primary index 38 is fully extendable into the coop 14. This enables the unloading of a trailer 12 from a single side without the need to re-position the trailer 12. Once the poultry 76 reach the point of transfer 64 upon the base unloader unit 34, they are transferred onto the mobile discharge belt 60.

Figure 11:
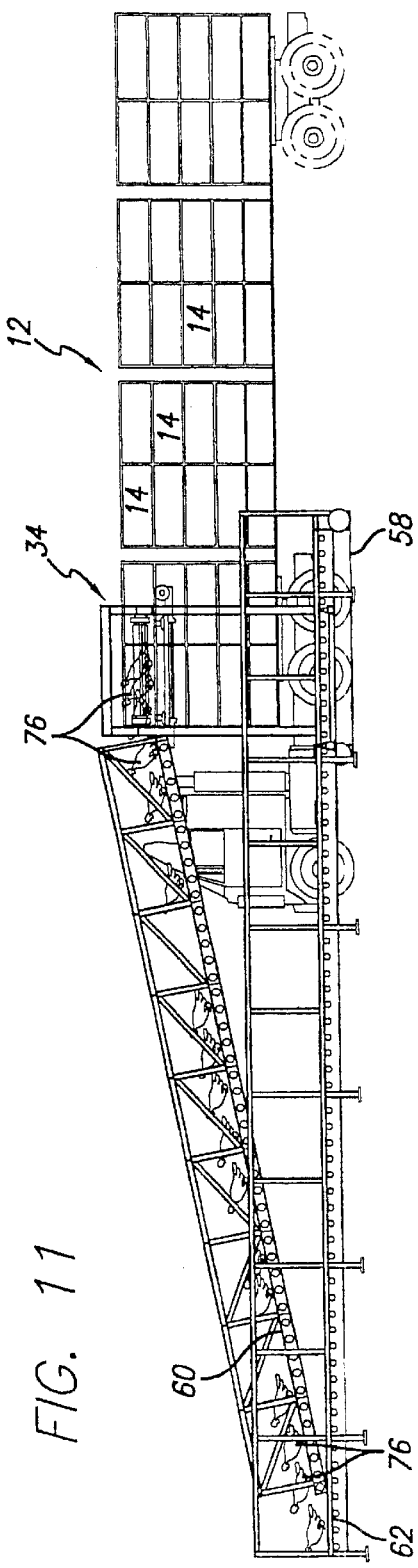
FIG. 11 is a side view unloading plant plan of the system of FIG. 9.

FIG. 11 illustrates all of the principal components of the present livestock unloading system. The trailer 12 has pulled up to the unloading site and parked perpendicular to the base unloader unit 34, parallel to the mobile discharge belt 60 and stationary discharge conveyor 62, with the railroad tracks 58 to begin the process. Poultry 76 has been unloaded from the coops 14 and has transferred from the primary index belt 44 through the point of transfer 64 to the mobile discharge belt 60 onto the stationary discharge conveyor 62.

Figure 12:
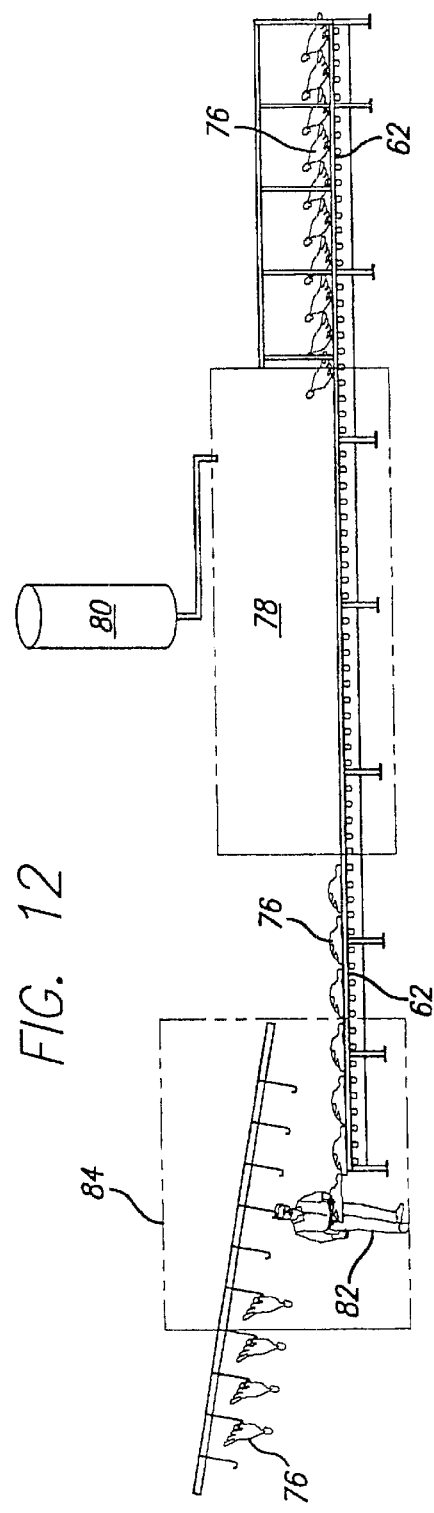
FIG. 12 is a side view of the unloading conveyor as it advances down the processing line.

Typically, such a poultry unloading system as described in the present invention will be utilized by a poultry processing plant. FIG. 12 is illustrative of one embodiment in which such a plant may incorporate. Referring thereto, the stationary discharge conveyor 62 transports poultry 76 into a stun unit 78, which is supplied by a carbon dioxide tank 80 or other means. The poultry will then exit the stun unit 78 anesthetized and can be easily shackled for further processing at the next station in the processing plant. This shackling may be accomplished through the use of a number of workmen 82, or preferably through the use of an automated shackling unit 84.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. A livestock unloading apparatus for unloading livestock from a storage unit positioned on a transport vehicle, said apparatus comprising:

a base member adapted to be supported on a ground surface;

a telescopic conveyor section movably mounted to and supported by said base member, said telescopic conveyor section positioned generally parallel to said ground surface and having a length, a livestock receiving end and a discharge end, said receiving end extendable from and retractable to said base member;

a mobile conveyor discharge belt section having a first end pivotably attached to said elevating support member to provide for a first point of transfer between said discharge end and said mobile conveyor discharge belt section, said mobile conveyor discharge belt section having a second end adaptable to traversing a surface;

a stationary discharge conveyor section for conveying the livestock for further processing, said second end of said mobile conveyor discharge belt section movably mounted to said stationary discharge conveyor section to provide a second point of transfer; and an elevating support member movably mounted to said base member for elevating said telescopic conveyor section.

2. A livestock unloading apparatus as defined in claim 1 further comprising ground engaging wheels upon the base member.

3. A livestock unloading apparatus as defined in claim 1 further comprising at least two rails positioned parallel with the length of the transport vehicle and rail engaging wheels upon the base member.

4. A livestock unloading apparatus as defined in claim 1 wherein said telescopic conveyor section includes an endless conveyor belt positioned about said length.

5. A livestock unloading apparatus as defined in claim 1 wherein said elevating support member includes a lifting mechanism comprised of a plurality of ball screw mechanisms.

6. A livestock unloading apparatus as defined in claim 1 further comprising a telescopic top conveyor belt positioned above and generally parallel with said telescopic conveyor section, said top conveyor extendable and retractable in unison with said telescopic conveyor section.

7. A livestock unloading apparatus as defined in claim 1 further including a tilt mechanism for the leveling of said telescopic conveyor section.

8. A livestock unloading apparatus as defined in claim 7 wherein said mechanism is capable of radial adjustment for the aligning of said base member to said vehicle.

9. A livestock unloading apparatus as defined in claim 1 wherein said first point of transfer is a generally perpendicular intersection of said discharge end of said telescopic conveyor section and said first end of said mobile conveyor discharge belt section.

10. A livestock unloading apparatus as defined in claim 1 wherein said mobile conveyor discharge belt section includes a cover and a fan.

11. A livestock unloading apparatus as defined in claim 1 wherein said stationary conveyor section includes a cover and at least one fan.

12. A livestock unloading apparatus as defined in claim 1 further including a storage unit for the storage of livestock during transport on a transport vehicle, said vehicle having two sides and a width extending from one side to the other; said unit being generally rectangular with a top, a bottom, two sides and two open ends; said sides of said unit generally extending said width of said vehicle such that said ends of said unit are readily accessible from either of said sides of said vehicle; each of said ends including a door.

13. A livestock unloading system, comprising:
 a storage unit for the storage of livestock during transport on a transport vehicle, said vehicle having two sides and a width extending from one side to the other; said unit being generally rectangular with a top, a bottom, two sides and two open ends; said sides of said unit generally extending said width of said vehicle such that said ends of said unit are readily accessible from either of said sides of said vehicle; each of said ends including a door; and
 an unloading apparatus, comprising:
  a base member adapted to be supported on a ground surface;
  a telescopic conveyor section movably mounted to and supported by said base member, said telescopic conveyor section positioned generally parallel to said ground surface and having a length, a livestock receiving end and a discharge end, said receiving end extendable and retractable from one end of a storage unit to the other; and
  an elevating support member movably mounted to said base member for elevating said telescopic conveyor section; and
  a mobile conveyor discharge belt section having a first end pivotably attached to said elevating support member to provide for a first point of transfer between said discharge end and said mobile conveyor discharge belt section, said point of transfer is a generally perpendicular intersection of said discharge end of said telescopic conveyor section and said first end of said mobile conveyor discharge belt section.

14. A livestock unloading system, comprising:
 a storage unit for the storage of livestock during transport on a transport vehicle, said vehicle having two sides and a width extending from one side to the other; said unit being generally rectangular with a top, a bottom, two sides and two open ends; said sides of said unit generally extending said width of said vehicle such that said ends of said unit are readily accessible from either of said sides of said vehicle; each of said ends including a door; and
 an unloading apparatus, comprising:
  a base member adapted to be supported on a ground surface;
  a telescopic conveyor section movably mounted to and supported by said base member, said telescopic conveyor section positioned generally parallel to said ground surface and having a length, a livestock receiving end and a discharge end, said receiving end extendable and retractable from one end of a storage unit to the other; and
  an elevating support member movably mounted to said base member for elevating said telescopic conveyor section; and
  a mobile conveyor discharge belt section having a first end pivotably attached to said elevating support member to provide for a first point of transfer between said discharge end and said mobile conveyor discharge belt section, said mobile conveyor discharge belt section having a second end adaptable to traversing a surface; and
  a stationary discharge conveyor section for conveying the livestock for further processing, said second end of said mobile conveyor discharge belt section movably mounted to said stationary discharge conveyor section to provide a second point of transfer.

15. A livestock unloading system as defined in claim 14 wherein said further processing includes an automated shackling unit.

16. A livestock unloading system as defined in claim 14 further comprising a biosecurity washing system.

17. A livestock unloading apparatus for unloading livestock from a storage unit positioned on a transport vehicle, said apparatus comprising:
 a base member adapted to be supported on a ground surface;
 a telescopic conveyor section movably mounted to and supported by said base member, said telescopic conveyor section positioned generally parallel to said ground surface and having a length, a livestock receiving end and a discharge end, said receiving end extendable from and retractable to said base member;
 an elevating support member movably mounted to said base member for elevating said telescopic conveyor section; and a mobile conveyor discharge belt section having a first end pivotably attached to said elevating support member to provide for a first point of transfer between said discharge end and said mobile conveyor discharge belt section, said point of transfer is a generally perpendicular intersection of said discharge end of said telescopic conveyor section and said first end of said mobile conveyor discharge belt section.

18. A livestock unloading apparatus as defined in claim 17, further including a stationary discharge conveyor section for conveying the livestock for processing, said second end of said mobile conveyor discharge belt section movably mounted to said stationary discharge conveyor section to provide a second point of transfer.

19. A livestock unloading apparatus as defined in claim 17 wherein said stationary conveyor section includes a cover and a fan.

20. A livestock unloading apparatus as defined in claim 17 further including:

a storage unit for the storage of livestock during transport on a transport vehicle said vehicle having two sides and a width extending from one side to the other; said unit being generally rectangular with a top, a bottom, two sides and two open ends; said sides of said unit generally extending said width of said vehicle such that said ends of said unit are readily accessible from either of said sides of said vehicle; each of said ends including a door.

21. A livestock unloading apparatus as defined in claim 17 further comprising a telescopic top conveyor belt positioned above and generally parallel with said telescopic conveyor section, said top conveyor extendable and retractable in unison with said telescopic conveyor section.

22. A livestock unloading apparatus as defined in claim 17 further including a tilt mechanism for the leveling of said telescopic conveyor section.

23. A livestock unloading apparatus as defined in claim 17 further including a radial adjustment mechanism for the aligning of said base member to said vehicle.

* * * * *